Patented Dec. 11, 1951

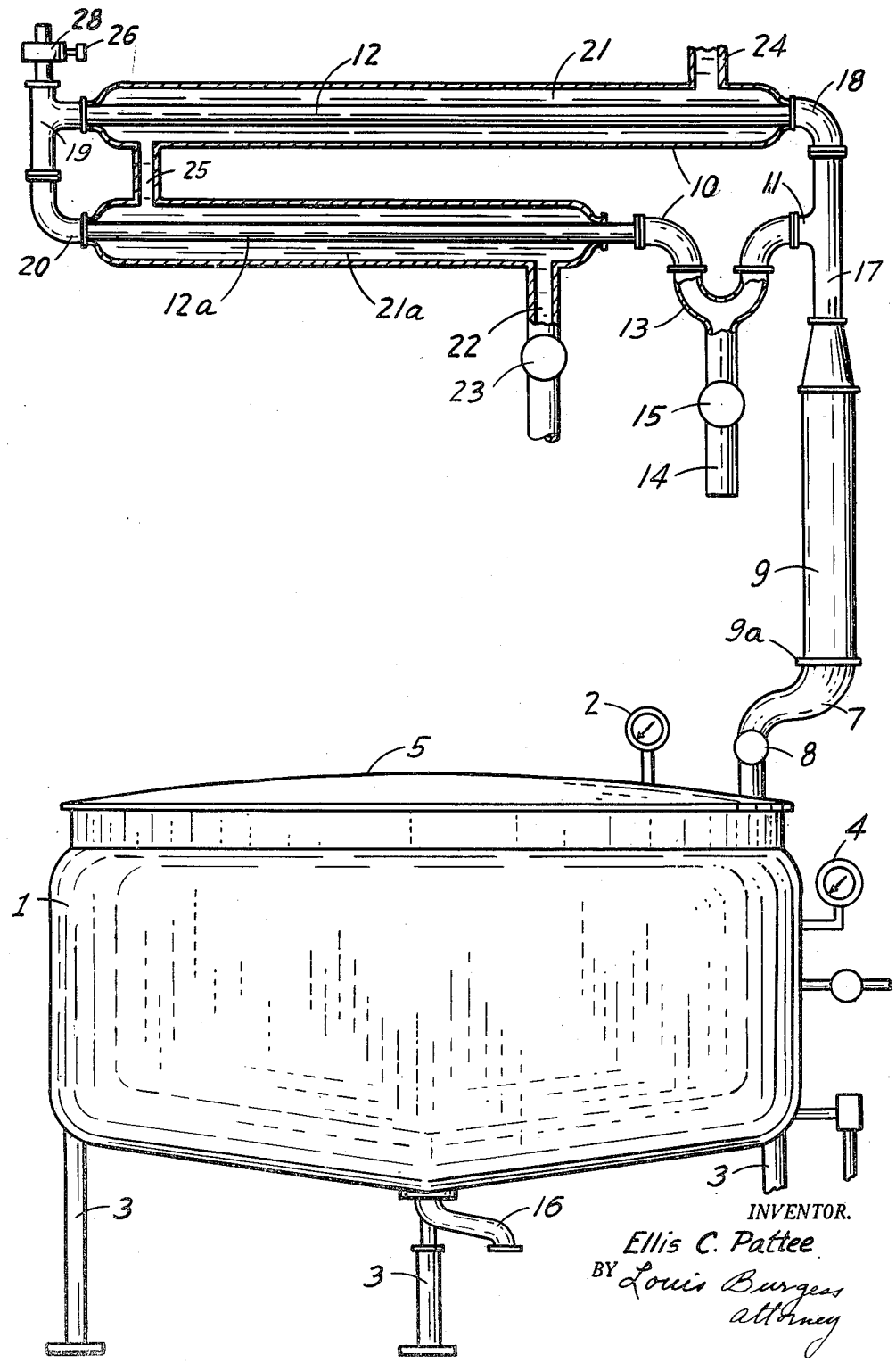

2,577,801

UNITED STATES PATENT OFFICE 2,577,801

HYDROLYZATION OF PENTOSAN CONTAINING PROTEIN MATERIALS

Ellis C. Pattee, Cincinnati, Ohio, assignor to National Distillers Products Corp., a corporation of Virginia Application September 30, 1948, Serial No. 52,117

2 Claims. (Cl. 260—529)

This invention relates to new and useful improvement in the hydrolyzation of pentosan containing protein materials.

In the conventional preparation of amino acids from protein materials, the latter are subjected to hydrolyzation with a suitable acid, usually an aqueous solution of a strong inorganic acid such as $H_2SO_4$ or $HCl$. If the protein material contains pentosans, furfural is formed as the result of the hydrolyzing digestion of the pentosans.

One object of the instant invention essentially comprises a simple and effective procedure for substantially continuously removing furfural in the hydrolyzation of a protein material containing pentosans.

The foregoing and further objects of the invention will be more fully understood from the following description read in conjunction with the drawing representing a diagrammatic illustration of an arrangement permitting the carrying out of the novel method in accordance with the invention.

As illustrated in the drawing, 1 represents a steam jacket heated digester provided with a pressure cover 5, provided with pressure gauge 2 communicating with the interior of the digester 1. The digester is mounted on legs 3 and carries pressure gauge 4 communicating with the steam jacket of the digester. Still connection 7 controlled by valve 8 is mounted on cover 5 in communication with the interior of digester 1. A packed column 9 is secured to still connection 7 by the flanged portion 9a, and extends upwardly into the neck portion 17 carrying at its upper end elbow connection 18. A combination condenser trap and reflux unit 10 is provided, being secured with the substantially horizontally extending upper condenser conduit 12 to the elbow 18. A lower, substantially horizontally extending condenser conduit 12a is connected to conduit 12 by way of the T-connection 19 and elbow 12 respectively. Lower conduit 12a communicates with one end of the U-shaped trap 13, the other end of which is secured to the reflux neck 11 mounted on the connection 17. Draw-off pipe 14, controlled by valve 15, is connected to the lower portion of trap 13. Condenser conduits 12 and 12a are respectively surrounded by the cooling jackets 21 and 21a. The jacket 21a is provided with inlet 22 controlled by valve 23, and jacket 21 is provided with outlet 24. A conduit 25 connects the end portions of jackets 21 and 21a. The reflux condenser is provided with vent 28 mounted on T-connection 19 and controlled by valve 26. Valve 26 may be adjusted to hold the system at or about atmospheric pressure. Alternatively, valve 26 may be adjusted so that the vent 28 will operate to hold the system at higher pressures.

In practical operation, a suitable pentosan containing protein material is placed into the digester 1, and provided with a hydrolyzing acid such as aqueous sulfuric and/or hydrochloric acid. I prefer to add to the protein material at least one chemical equivalent of $HCl$ for each gram atom of nitrogen, and at least one chemical equivalent of $H_2SO_4$ for each gram atom of nitrogen, and preferably not exceeding 1.5 chemical equivalents of $H_2SO_4$ for each gram atom of nitrogen present. The inorganic acids are present preferably to the extent of 10–25% by weight of the combined weight of the water and inorganic acid.

Suitable pentosan containing materials are, for instance, so-called "distillers dried grains" derived from the starch fermentation of cereals and freed from oily matter, if necessary, by appropriate solvent extraction such as with hexane.

The temperature within the digester is preferably maintained substantially between 100 and 110° C., and the mass is kept well agitated. Valve 8 is open and valve 26 is adjusted to so control vent 28 that the system is substantially maintained at atmospheric pressure. Pentosan digestion to furfural will commence, and water and furfural vapors will pass into and through the packed column 9 through elbow connection 18 into the condenser conduit 12. At least partial condensation will take place in condenser conduit 12 and the condensate, together with uncondensed vapors, will pass through T-piece 19 and elbow 20 into the lower condenser conduit 12a. Cooling liquid passes countercurrent-fashion into inlet 22 through the jacket 21a through conduit 25 into jacket 21 and out through outlet 24. The condensate passes into the trap 13 separating into a lower furfural layer and an upper aqueous layer. The furfural layer trapped in the trap 13 can be continuously withdrawn through the conduit 14 valved at 15, while the upper aqueous layer will continuously flow back through the reflux neck 11 into the column 9 and thus into the digester 1, thereby assuring that the concentration of aqueous medium in the digester remains substantially constant.

After the completion of the furfural digestion, valve 8 is closed, and the temperature within digesting kettle 1 is raised. Pressure is permitted to build up and is maintained for a sufficient period to assure the amino acid digestion of the protein material to the desired extent.

At the end of the protein digestion period, the contents of the tank may be flash released through valve bottom outlet 16 onto suitable filters whence the filtrate containing a mixture of amino acid salts is further treated for the removal of acid.

The hydrochloric-sulfuric acid combination treatment has the advantage that most of the hydrochloric acid can be removed by distillation.

The following example is furnished by way of illustration but not of limitation:

Example

A 100 pound charge of distillers dried grains was placed into a digester of the type herein described, and equipped with a column condenser and trap arrangement herein illustrated. The charge was mixed with a solution composed of about 17 pounds of 66° Bé. sulfuric acid, about 144 pounds of 18° Bé. hydrochloric acid, and 164 pounds of water. The mixture was then heated until refluxing began, with the vent valve adjusted to substantially maintain atmospheric pressure within the system. The temperature in the digester was approximately 110° C. Refluxing was continued for a period of about 3 hours continuously withdrawing furfural from the draw-off pipe. At the end of this time, about 7 pounds of furfural were collected, the mixture remaining in the digester. The mixture in the digester was then ready for such further use as might be desired, such as, for instance, amino acid hydrolyzation.

The foregoing description is for the purposes of illustration and not of limitation and it is therefore my intention that the invention be limited only by the appended claims or their equivalent wherein I have endeavored to claim broadly all inherent novelty.

I claim:

1. Improvement in the amino acid hydrolyzation of pentosan containing protein materials which comprises subjecting an aqueous mix of a pentosan containing protein material to furfural hydrolyzation within a closed system by continuously heating the same in the presence of an inorganic hydrolyzing acid selected from the group consisting of aqueous sulfuric and hydrochloric acids to a temperature of about 100–110° C. and substantially maintaining atmospheric pressure within said system, substantially continuously distilling off water-furfural vapors within said system, and substantially continuously condensing said vapors within said system, substantially continuously separating condensed furfural within said system and returning condensed water to the hydrolyzing mix, and subjecting said mix after completed furfural hydrolyzation to amino acid digestion within said system by increasing the pressure therein and recovering amino acids from the last treated mix.

2. Improvement in the amino acid hydrolyzation of pentosan containing protein materials which comprises subjecting an aqueous mix of a pentosan containing protein material to furfural hydrolyzation within a closed system by continuously heating the same in the presence of an inorganic hydrolyzing acid composed of aqueous sulfuric and hydrochloric acids to a temperature of about 100–110° C. and substantially maintaining atmospheric pressure within said system, substantially continuously distilling off water-furfural vapors within said system, and substantially continuously condensing said vapors within said system, substantially continuously separating condensed furfural within said system, and returning condensed water to the hydrolyzing mix, and subjecting said mix after completed furfural hydrolyzation to amino acid digestion within said system by increasing the pressure therein and recovering amino acids from the last treated mix.

ELLIS C. PATTEE.

REFERENCES CITED

The following references are of record in the file of this patent:

UNITED STATES PATENTS

| Number | Name | Date |
| --- | --- | --- |
| 1,073,392 | Braun | Sept. 16, 1913 |
| 1,308,356 | Houlehan | July 1, 1919 |
| 1,322,054 | Ricard | Nov. 18, 1919 |
| 1,735,084 | Miner et al. | Nov. 12, 1929 |
| 1,919,877 | Brownlee | July 25, 1933 |
| 2,260,111 | Caldwell | Oct. 21, 1941 |